US006131047A

United States Patent [19]
Hayes, Jr. et al.

[11] Patent Number: 6,131,047
[45] Date of Patent: Oct. 10, 2000

[54] RADIOTELEPHONES HAVING CONTACT-SENSITIVE USER INTERFACES AND METHODS OF OPERATING SAME

[75] Inventors: John Joseph Hayes, Jr., Wake Forest; Curtis Wayne Thornton, Cary, both of N.C.

[73] Assignee: Ericsson Inc., Research Triangle Park, N.C.

[21] Appl. No.: 09/001,173

[22] Filed: Dec. 30, 1997

[51] Int. Cl.[7] ............................... H04B 1/38; G09G 5/00
[52] U.S. Cl. ........................... 455/566; 455/575; 455/90; 345/173
[58] Field of Search ..................................... 379/433, 428; 455/556, 575, 95, 550, 90, 566; 345/173, 168, 156

[56] References Cited

U.S. PATENT DOCUMENTS

| | | | |
|---|---|---|---|
| 3,777,222 | 12/1973 | Harris | 341/26 |
| 4,177,421 | 12/1979 | Thornburg | 324/725 |
| 4,566,001 | 1/1986 | Moore et al. | 345/173 |
| 4,647,916 | 3/1987 | Boughton | 345/156 |
| 4,739,299 | 4/1988 | Eventoff et al. | 338/99 |
| 4,810,992 | 3/1989 | Eventoff | 338/99 |
| 4,870,677 | 9/1989 | Di Santo et al. | 379/93.19 |
| 5,184,120 | 2/1993 | Schultz | 340/870.38 |
| 5,422,656 | 6/1995 | Allard et al. | 345/173 |
| 5,452,240 | 9/1995 | Roca et al. | 364/705.06 |
| 5,459,776 | 10/1995 | Di Santo et al. | 379/93.19 |
| 5,572,573 | 11/1996 | Sylvan et al. | 455/556 |
| 5,584,054 | 12/1996 | Tyneski et al. | 455/566 |
| 5,598,527 | 1/1997 | Debrus et al. | 345/173 |
| 5,710,810 | 1/1998 | Tiilikainen | 379/355 |
| 5,715,524 | 2/1998 | Jambhekar et al. | 455/90 |
| 5,719,936 | 2/1998 | Hillenmayer | 379/447 |
| 5,815,142 | 9/1998 | Allard et al. | 345/173 |
| 5,859,629 | 1/1999 | Tognazzini | 345/173 |
| 5,915,228 | 6/1999 | Kunihiro et al. | 455/575 |
| 5,920,310 | 7/1999 | Faggin et al. | 345/173 |

FOREIGN PATENT DOCUMENTS

| | | |
|---|---|---|
| 0 698 845 A1 | 2/1996 | European Pat. Off. . |
| 0 707 257 A1 | 4/1996 | European Pat. Off. . |
| 59-153342 | 1/1985 | Japan . |
| 8-030378 | 3/1998 | Japan . |

OTHER PUBLICATIONS

International Search Report, PCT/US98/27042, May 11, 1999.
VersaPad™, *VersaPad Finished DataSheet*, http://www.interlinkelec.com/magic/page02g.htm, Oct. 9, 1997, pp. 1–3.

*Primary Examiner*—Reinhard J. Eisenzopf
*Assistant Examiner*—Charles N. Appiah
*Attorney, Agent, or Firm*—Myers Bigel Sibley & Sajovec

[57] ABSTRACT

A radiotelephone includes a housing, and a radiotelephone communications transceiver and display are attached to the housing. A contact-sensitive transducer such as a resistive transducer, a capacitive transducer or a semiconductive transducer, is attached to the housing and produces an output signal that characterizes contact with a contact-sensitive surface of the contact-sensitive transducer. A controller is responsive to the output signal and operatively associated with the display and the radiotelephone communications transceiver, and controls at least one of the display and the radiotelephone communications transceiver according to the output signal of the contact-sensitive transducer. The controller, responsive to the contact-sensitive transducer, may determine a position of contact along an axis of the contact-sensitive transducer. A graphical object is selectively displayed based on the determined position of contact to thereby identify the graphical object, e.g., by highlighting one of a plurality of displayed graphical objects or by displaying a cursor that indicates one of a plurality of displayed graphical objects. In yet another embodiment, the controller is configured to cause the display or the radiotelephone communications transceiver to perform a plurality of actions. An action of the plurality of actions may be associated with an identified graphical object, and the controller may initiate the action associated with the identified graphical object in response to, for example, detection of a momentary contact of an object with the contact-sensitive transducer.

6 Claims, 9 Drawing Sheets

ns transceiver is effected using a contact-sensitive transducer such as a resistive or capacitive touch strip mounted on the radiotelephone. The contact-sensitive transducer produces an output signal that characterizes contact, e.g., contact of an object such as a user's finger, with a surface of the transducer. The output signal may be processed by a controller to control display of information on the display and to initiate actions associated with displayed items. For example, the contact-sensitive transducer may be used to control display of graphical objects such as rows or columns on the display, and initiation of functions associated with the graphical objects. Preferably, the contact-sensitive transducer comprises an elongate strip and produces an output signal that characterizes contact with the strip along its elongate axis. In one embodiment, two of such elongate strips are mounted on respective sides of the radiotelephone. In another embodiment, an elongate strip is mounted on a front face of the radiotelephone.

RADIOTELEPHONES HAVING CONTACT-SENSITIVE USER INTERFACES AND METHODS OF OPERATING SAME

FIELD OF THE INVENTION

The present invention relates to radiotelephones and methods of operation thereof, and more particularly, to apparatus and methods for providing user input to radiotelephones.

BACKGROUND OF THE INVENTION

Radiotelephone terminals typically include a radio transceiver integrated with a user interface mechanism within a handheld case. The user interface typically includes a plurality of keys similar to those provided on conventional wireline telephones, as well as additional function keys for controlling functions associated with radiotelephone operations. The keys provide a means for entering commands, telephone numbers or other data for processing by the radiotelephone. A display may be used to display information a user has entered at the keys, e.g., telephone numbers, menu selections, and the like, as well as to display messages or other information received from a radiotelephone system with which the radiotelephone is communicating. The display may also be used to display information stored in memory located in the radiotelephone.

Commonly, the display is configured to display one or more graphical objects, e.g., a list of commands in a command menu or a list of telephone numbers that are stored in the radiotelephone memory that the user may select for communication. The graphical objects may be selectively displayed, for example, by displaying a selected number of entries in a list of telephone numbers or command options. The list may be "scrolled" in response to a user input to allow a large list to be displayed on a small display.

In some conventional radiotelephones, control of the scrolling of graphical objects on the display may be controlled by one or more keys, the operation of which may be similar to the "arrow" keys provided on computer keyboard. Other keys may be provided to invoke particular selections. In other conventional radiotelephone designs, a wheel-like input device may be mounted on the radiotelephone case that may be turned by a user to effect scrolling of graphical objects on the display. The wheel device may also be configured to select items on the display in response to user application of radial pressure to the wheel.

Each of these conventional techniques for control of a radiotelephone display has its limitations. Keys for scrolling and invoking display selections may be awkward to use, and may consume valuable space on the keypad of the radiotelephone. A wheeled input device may provide faster and more intuitive scrolling control, but such a device may take up an inordinate amount of space and require moving parts which may be more prone to failure. Accordingly, there is a need for improved input devices for radiotelephones.

SUMMARY OF THE INVENTION

In light of the foregoing, it is an object of the present invention to provide radiotelephones and methods of operation thereof which provide reliable, intuitive and efficient display control.

This and other objects, features and advantages are provided according to the present invention by radiotelephones and methods of operation thereof in which control of a radiotelephone's display and/or radiotelephone communications transceiver is effected using a contact-sensitive transducer such as a resistive or capacitive touch strip mounted on the radiotelephone. The contact-sensitive transducer produces an output signal that characterizes contact, e.g., contact of an object such as a user's finger, with a surface of the transducer. The output signal may be processed by a controller to control display of information on the display and to initiate actions associated with displayed items. For example, the contact-sensitive transducer may be used to control display of graphical objects such as rows or columns on the display, and initiation of functions associated with the graphical objects. Preferably, the contact-sensitive transducer comprises an elongate strip and produces an output signal that characterizes contact with the strip along its elongate axis. In one embodiment, two of such elongate strips are mounted on respective sides of the radiotelephone. In another embodiment, an elongate strip is mounted on a front face of the radiotelephone.

Using a contact-sensitive transducer to control a radiotelephone offers several advantages. Because a contact-sensitive transducer may be configured to have a thin profile, the transducer may be mounted at a surface of the radiotelephone without taking up an inordinate amount of valuable space. Because characteristic types of contact with the transducer can be detected, such as swiping motions or taps, the transducer may be used to perform display movements such as scrolling or cursor movement, as well as for selection of items displayed on the display. In addition, because a contact-sensitive transducer may be fabricated without moving parts, reliability may be improved.

In particular, according to an aspect of the present invention, a radiotelephone includes a frame. The frame supports a radiotelephone communications transceiver and a display. A contact-sensitive transducer such as a resistive transducer, a capacitive transducer or a semiconductive transducer, is supported by the frame, e.g., mounted at a surface of a housing, and produces an output signal that characterizes contact along a contact-sensitive surface of the contact-sensitive transducer. A controller is responsive to the output signal and operatively associated with the display and the radiotelephone communications transceiver, and controls at least one of the display and the radiotelephone communications transceiver according to the output signal of the contact-sensitive transducer.

In an embodiment of the present invention, the controller is configured to selectively display an image, e.g., a graphical object such as a row of alphanumeric characters, on the display responsive to the output signal of the contact-sensitive transducer. The controller may include means for displaying of a plurality of graphical objects on the display, and means, responsive to the contact sensitive transducer, for identifying one of the displayed plurality of graphical objects based on the output signal of the contact-sensitive transducer.

According to another embodiment, the controller comprises means, responsive to the contact-sensitive transducer, for determining a position of contact along the axis of the contact-sensitive transducer. Means are also provided, responsive to the means for determining a position of contact, for selectively displaying a graphical object based on the determined position of contact to thereby identify the graphical object, e.g., by highlighting one of a plurality of displayed graphical objects or by displaying a cursor that indicates one of a plurality of displayed graphical objects.

In yet another embodiment of the present invention, the controller is configured to cause the display or the radiotelephone communications transceiver to perform a plurality of actions. An action of the plurality of actions may be associated with an identified graphical object, and the controller may further comprise means, responsive to the contact-sensitive transducer, for initiating the action associated with the identified graphical object. The means for initiating an action may include means, responsive to the contact-sensitive transducer, for detecting a momentary contact with the transducer. Means may be provided, responsive to the means for detecting a momentary contact, for initiating the action associated with the identified graphical object. The means for initiating an action may include means for initiating the action in response to detection of a predetermined number of momentary contacts occurring within a predetermined time interval.

According to another embodiment of the present invention, the controller includes means, responsive to the contact-sensitive transducer, for scrolling displayed rows along an axis of the display based on the output signal of the contact-sensitive transducer. The means for scrolling may include means, responsive to the output signal of contact-sensitive transducer, for detecting moving contact with the contact-sensitive transducer along the axis of the contact-sensitive transducer, and means, responsive to the means for detecting moving contact, for scrolling displayed rows along the axis of the display based on the detected movement.

In yet another embodiment of the present invention, the controller has a first mode wherein the controller is responsive to contact with the contact-sensitive transducer and a second mode wherein the controller is unresponsive to contact with the contact-sensitive transducer. The radiotelephone further comprises means for placing the controller in one of the first mode or the second mode in response to an input from a user.

Another embodiment according to the present invention includes a power supply electrically connected to the contact-sensitive transducer. The controller comprises a first control circuit, responsive to the contact-sensitive transducer, which controls the radiotelephone communications transceiver and the display according to the output signal of the contact-sensitive transducer, and a second control circuit, responsive to the contact-sensitive transducer, which controls power transfer from the power supply to the first control circuit according to the output signal from the contact-sensitive transducer. The first control circuit may include a microcontroller, and the second control circuit may control power transfer from the power supply to the microcontroller according to the output signal of the contact-sensitive transducer.

In another embodiment according to the present invention, the radiotelephone frame includes a housing and the contact-sensitive transducer comprises an elongate contact-sensitive strip mounted at a surface of the housing. The housing may have a front face and an adjoining first side, the display may be mounted at the front face, and the elongate contact-sensitive strip may be mounted at the first side adjoining the front face. A second contact-sensitive strip may be mounted at a second side of the radiotelephone housing, adjoining the front face and opposite the first side. According to another embodiment, a contact-sensitive transducer may be mounted at the front face of the housing.

According to method aspects of the present invention, user input is provided to a radiotelephone using a contact-sensitive transducer that produces an output signal that characterizes contact of an object on a contact-sensitive surface of the contact-sensitive transducer. At least one of a radiotelephone communications transceiver and a display of the radiotelephone may be controlled according to the output signal of the contact-sensitive transducer. An image may be selectively displayed on the radiotelephone display according to the output signal of the contact-sensitive transducer. Improved user interfaces for radiotelephones are thereby provided.

DETAILED DESCRIPTION OF PREFERRED EMBODIMENTS

The present invention now will be described more fully hereinafter with reference to the accompanying drawings, in which embodiments of the invention are shown. Those skilled in the art will appreciate that the invention may be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout. It will be understood that when a first object, e.g., a contact-sensitive transducer strip, is referred to as mounted "at" a surface of a second object, e.g., a housing or the like, the first object may be mounted directly on the surface of the second object, on a structural element or frame underlying the surface of the second object which allows a surface of the first object accessible through an opening in the surface of the second object, and the like.

Figure 1:
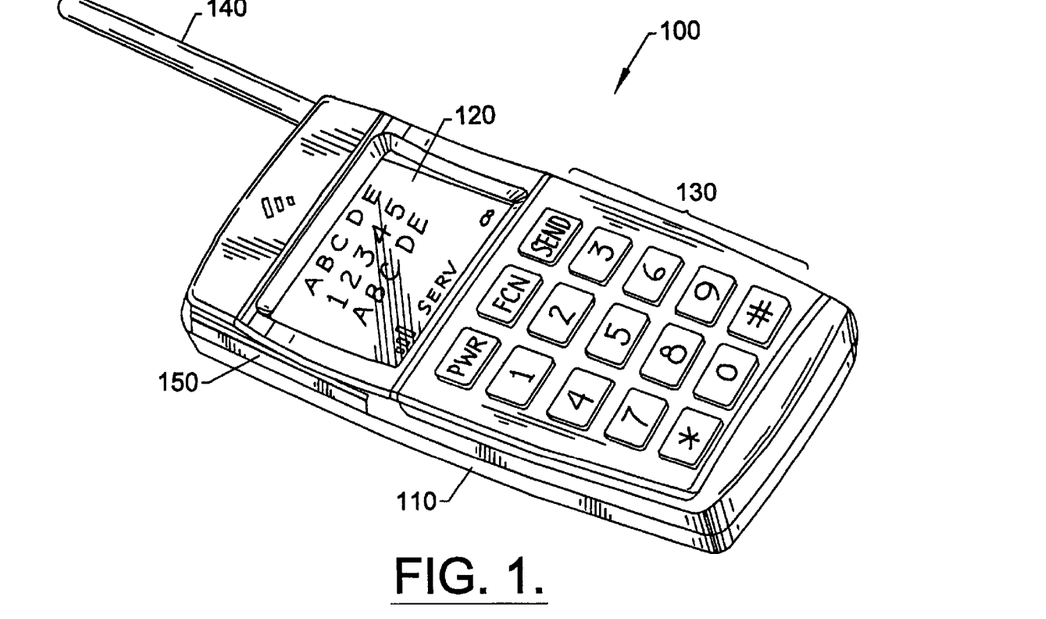
FIG. 1 illustrates a radiotelephone according to an embodiment of the present invention.

FIG. 1 illustrates a radiotelephone 100 in which the apparatus and methods according to an embodiment of the present invention may be embodied. The radiotelephone includes a frame, here shown as including a housing 110.

The housing 110 supports a display 120 and a plurality of keys 130. Those skilled in the art will appreciate that also included but not illustrated are a radiotelephone communications transceiver for communicating with a radiotelephone system, e.g., transmitter, receiver and associated control circuits for communicating with a cellular system via an antenna 140. The radiotelephone communications transceiver and the display 120 are controlled by a contact-sensitive transducer 150 mounted at a side surface of the radiotelephone housing 110, adjacent the display 120. It will be appreciated that the contact-sensitive transducer 150 may be attached to the housing 110 in a variety of different ways. For example, the transducer 150 may be attached to an outer surface of the housing 110, attached to a boss or similar structure attached to an outer surface of the housing 110, attached to a circuit board or similar structure mounted within the housing 110 and extending through an opening in a surface of the housing 110, or the like.

Figure 2:
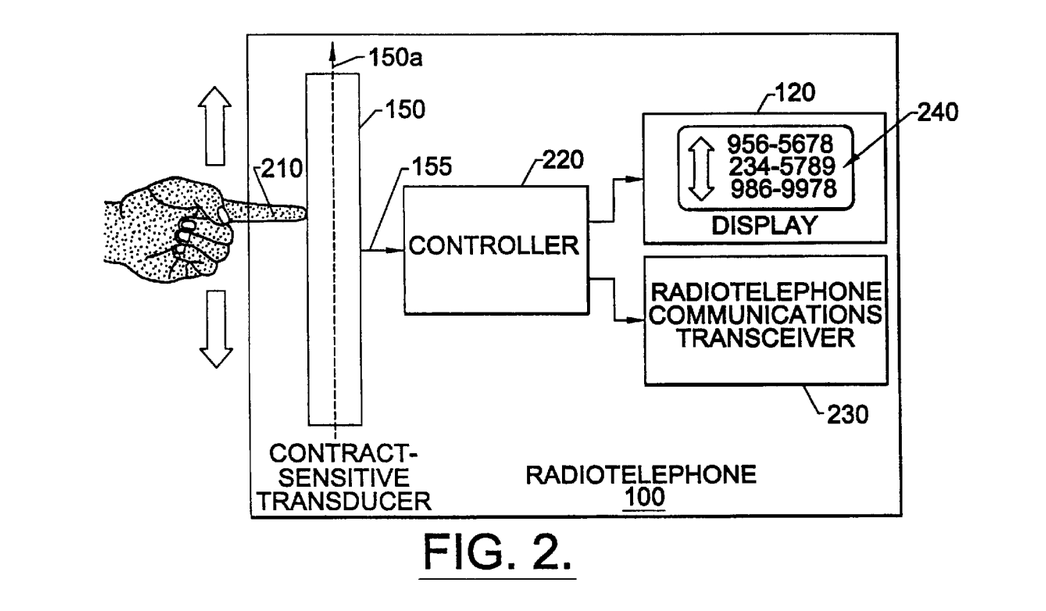
FIG. 2 is a schematic diagram illustrating a radiotelephone according to an embodiment of the present invention.

Referring now to FIG. 2, the contact-sensitive transducer 150 produces an output signal 155 that characterizes contact of an object, such as a user's finger 210, along an axis 150a of the transducer 150. A controller 220 is responsive to the output signal 155 and operatively associated with the display 120 and a radiotelephone communications transceiver 230. The controller 220 selectively display an image, such as one or more rows 240 of alphanumeric characters, on the display 120 based on the output signal 155 produced by the contact-sensitive transducer 150. The controller also controls the radiotelephone communications transceiver 230 according to the output signal 155. The contact-sensitive transducer 150 may comprise a variety of different contact-sensitive devices, including resistive, capacitive or semiconductive strips. For example, the contact-sensitive transducer 150 may be implemented using a semiconductive pad-type transducer of the type manufactured by Interlink Corp.

Figure 3:
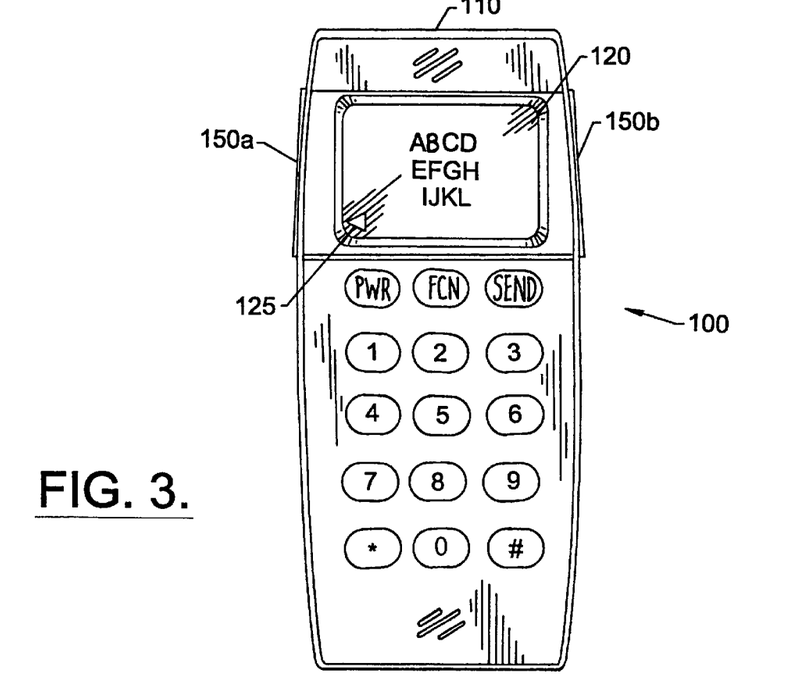
FIG. 3 illustrates a radiotelephone with dual contact-sensitive strips according to another embodiment of the present invention.

FIG. 3 illustrates an embodiment of the present invention, in which dual contact sensitive strips 150a, 150b are attached on opposite sides of a radiotelephone housing 110, adjacent the display 120. By providing strips on both sides of the radiotelephone housing 110, the radiotelephone 100 may be used in either a right-handed or left-handed fashion. Preferably, only one of the strips 150a, 150b is active at any given time, i.e., one of the strips is inactivated to prevent inadvertent generation of signals to the controller caused by gripping of the radiotelephone. The active strip may be indicated by, for example, displaying an icon 125 near the edge of the display 120 closest the active strip 150a.

Figure 4:
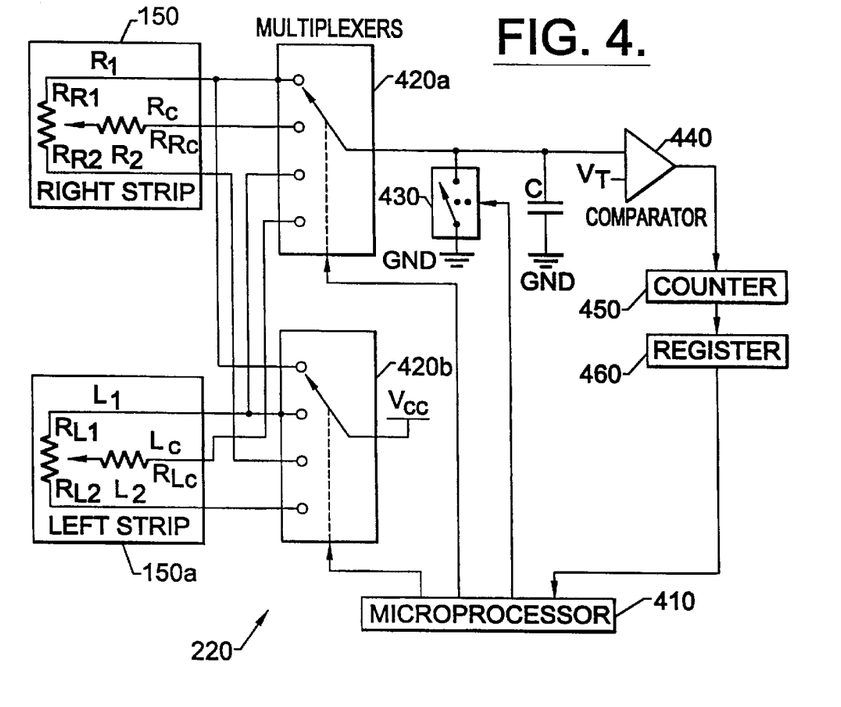
FIG. 4 is a schematic diagram illustrating a circuit for controlling a display using a contact-sensitive transducer according to another embodiment of the present invention.

FIG. 4 illustrates an exemplary embodiment of the controller 220 that includes a circuit connected to nodes $R_1$, $R_2$, $R_c$, $L_1$, $L_2$, $L_c$ of the transducers 150a, 150b. Voltages between the nodes $R_1$ and $R_c$ and nodes $L_1$ and $L_c$ are sampled under the control of a microcontroller 410 which controls multiplexers 420a, 420b and a discharge switch 430, selectively applying the voltages at the nodes $R_1$, $R_2$, $R_c$, $L_1$, $L_2$, $L_c$ to capacitor C. A comparator 440, in conjunction with a counter 450, determines the time required to charge the capacitor C to a threshold voltage $V_T$ after a node of one of the transducers 150a, 150b is connected to the capacitor C. A trio of charge times is sampled for a given transducer, providing a measure of a position of contact of an object with the transducer, as will be described in detail below. The counts produced by the counter 150, representing contact position samples, are latched into a register 460, and in turn conveyed to the microcontroller 410 for further processing.

Those skilled in the art will appreciate that a wide variety of apparatus other than the illustrated embodiment of FIG. 4 may be used with the present invention. For example, a different type of contact-sensitive transducer may be employed which utilizes a different kind of controller circuitry to processes output signals produced by the contact-sensitive transducer. In general, it will be appreciated that a controller 220 for processing output signals produced by a contact-sensitive transducer and for controlling a display 120 and a radiotelephone communications transceiver 230 according to the output signal, as described with respect to FIG. 2, may be implemented using special purpose hardware, software or firmware running on general-purpose or special-purpose computing apparatus, or combinations thereof.

Figure 5:
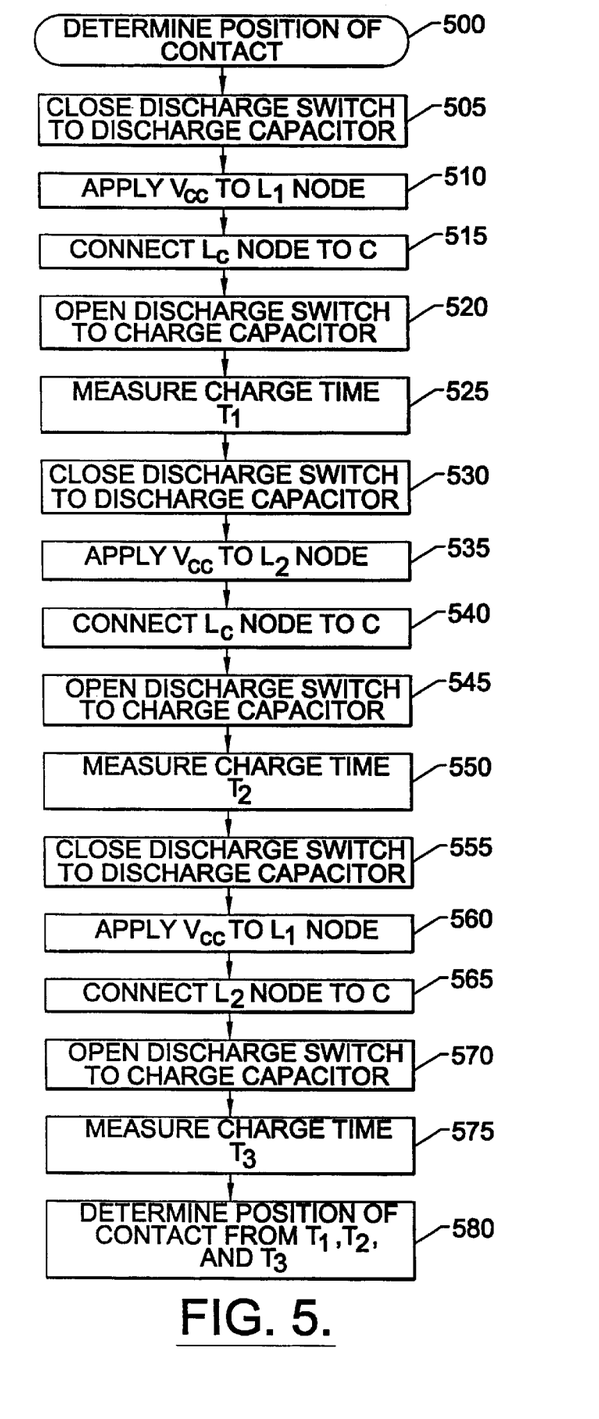
FIG. 5 is a flowchart illustration of operations for determining a position of contact of an object with a contact-sensitive transducer according to an aspect of the present invention.

The flowchart illustration of FIG. 5 illustrates methods and apparatus for determining a position of contact with a contact-sensitive transducer according to an aspect of the present invention. It will be understood that blocks of the flowchart illustration, and combinations of blocks in the flowchart illustration, can be implemented by computer program instructions which may be loaded onto a computer or other programmable data processing apparatus to produce a machine such that the instructions which execute on the computer or other programmable data processing apparatus create means for implementing the functions specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks. Accordingly, blocks of the flowchart illustration support combinations of means for performing the specified functions and combinations of steps for performing the specified functions. It will also be understood that each block of the flowchart illustrations, and combinations of blocks in the flowchart illustration, can be implemented by special purpose hardware which performs the specified functions or steps, or combinations of special purpose hardware such as the microcontroller 410 of FIG. 4, microprocessors, digital signal processing (DSP) chips, application-specific integrated circuits (ASICS) or the like, which execute computer instructions.

FIG. 5 illustrates exemplary detailed operations (Block 500 et seq.) for determining a position of contact of an object with the left contact strip 150a of FIG. 3. The discharge switch 430 is closed to discharge the capacitor C (Block 505). The power supply voltage $V_{cc}$ is then applied to the $L_1$ node (Block 510), and the $L_c$ node is connected to the capacitor C (Block 515). The discharge switch 430 is then opened to charge the capacitor C (Block 520), and a first capacitor charge time $T_1$ is measured (Block 525). The capacitor C is then discharged by closing the switch 430 again (Block 530). The power supply voltage $V_{cc}$ is next applied to the $L_2$ node (Block 535), and the $L_c$ node is connected to the capacitor C (Block 540). The discharge switch 430 is then opened (Block 545), and a second capacitor charge time $T_2$ is measured (Block 550). The capacitor C is discharged once again by closing the discharge switch 430 (Block 555). The power supply voltage $V_{cc}$ is then applied to the $L_1$ node (Block 560), and the $L_2$ node is connected to the capacitor C (Block 565). The discharge switch 430 is opened (Block 570), and a third capacitor charge time $T_3$ is measured (Block 575). The first, second and third capacitor charge times $T_1$, $T_2$, $T_3$ are then used to determine a position of contact with the transducer 520b (Block 580).

In particular, three equations are applicable to the measurements described with respect to FIG. 5:

$$T_1 = k(R_{L_1} + R_{L_c});$$

$$T_2 = k(R_{L_2} + R_{L_c});$$

and $$T_3 = k(R_{L_1} + R_{L_2}),$$

where $$k = -C \ln(1 - V_i/V_{cc}).$$

These equations may be solved for $R_{L_1}$, $R_{L_2}$ and $R_{L_c}$, and the position of contact P can be determined as:

$$P = \frac{R_{L_1}}{R_{L_1} + R_{L_2}}.$$

Those skilled in the art will appreciate that similar operations may be performed to determine a position of contact with the right contact strip 150a. It will also be understood that by application of appropriate control signals to the multiplexers 420a, 420b, either one of the transducers 150a, 150b may be disconnected from the capacitor C, effectively preventing input from the disconnected transducer.

Figure 6A:
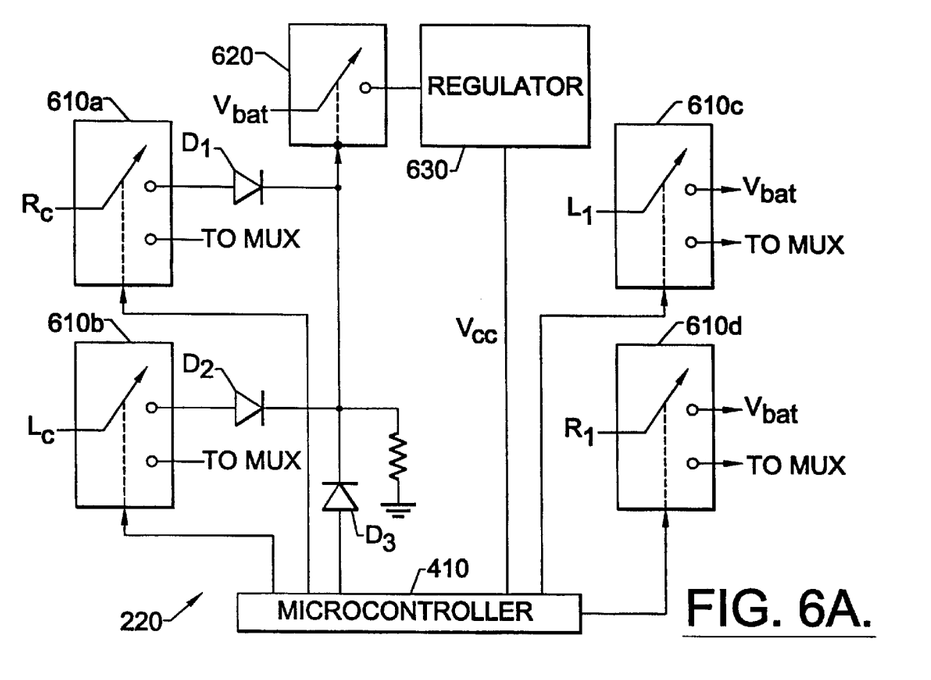
FIG. 6 is a schematic diagram illustrating a circuit for controlling power supply to a radiotelephone using a contact-sensitive transducer according to another embodiment of the present invention.

FIG. 6A illustrates another embodiment of the present invention, specifically a circuit which may be used in conjunction with the control circuit illustrated in FIG. 4 to control power transfer from a power supply, e.g., a battery supplying a battery voltage $V_{bat}$, to the microcontroller 410 and/or other circuits in a radiotelephone based on input signals from a contact-sensitive transducer. Additional switches 610a–610d may be provided in the signal paths connecting the nodes $R_c$, $L_c$, $R_1$, $L_1$. These switches may be used to connect the associated nodes to the control input for the switch 620 via diodes $D_1$, $D_2$ (in the case of nodes $R_c$, $L_c$) and to the battery voltage $V_{bat}$ (in the case of nodes $R_1$, $L_1$) in an "off" state, as shown. In the off state, a power switch 620 disconnects the battery voltage $V_{bat}$ from a regulator 630 that provides a regulated power supply voltage $V_{cc}$ to the microcontroller 410.

Figure 6B:
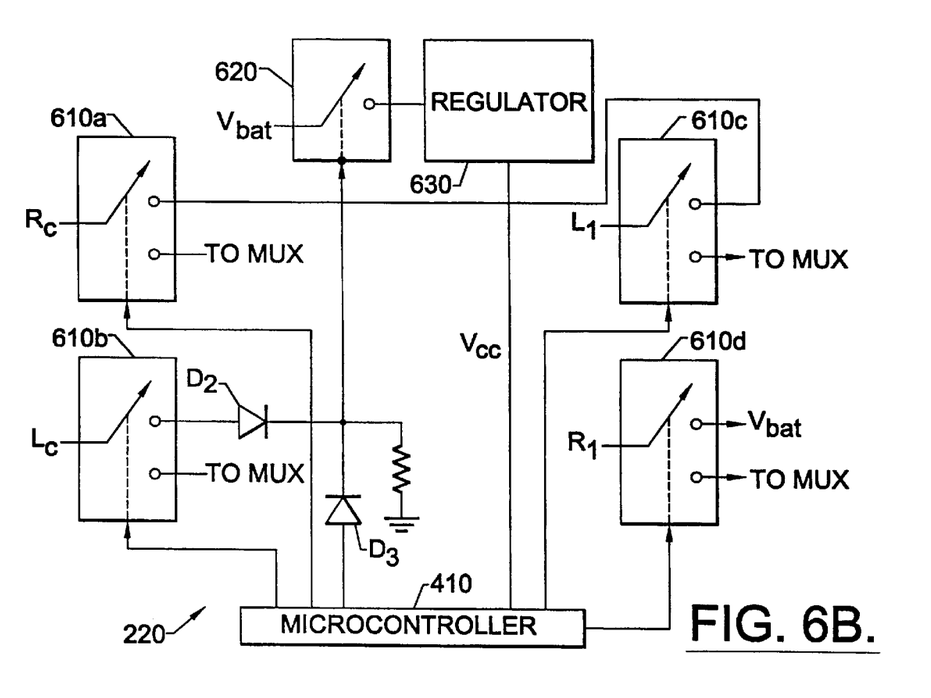

When either of the right or the left strips 150a, 150b is pressed such that a voltage is produced sufficient to overcome the drop across the associated diode $D_1$, $D_2$ and the input activation voltage of the power switch 620, the power switch 620 closes and applies the battery voltage $V_{bat}$ to the regulator 630. Power is thus provided to the microcontroller 410. The microcontroller may then latch the power switch 620 into a sustained "on" state by driving a third diode $D_3$ and by applying control signals to the switches 610a–610d to connect the nodes $R_c$, $L_c$, $R_1$, $L_1$ the appropriate multiplexers as illustrated in FIG. 4. The microcontroller 410 may return the power switch 620 to the "off" state by inverting the logic on the line driving the third diode $D_3$. Because a specific voltage is needed to activate the power switch 620, accidental activation of the radiotelephone can be prevented. According to another embodiment illustrated in FIG. 6B, the circuit of FIG. 6A may be modified such pressure on both of the strips 150a, 150b is required to power up the regulator 630. When the right strip 150b is pressed, the battery voltage $V_{bat}$ is applied from $R_1$ and $R_c$ to $L_1$. If the left strip 150a is simultaneously pressed, the voltage is also applied to the control input of the power switch 620 through $D_2$. Otherwise, the operation of the circuit of FIG. 6B is similar to that described with respect to the circuit of FIG. 6A.

Figure 7A:
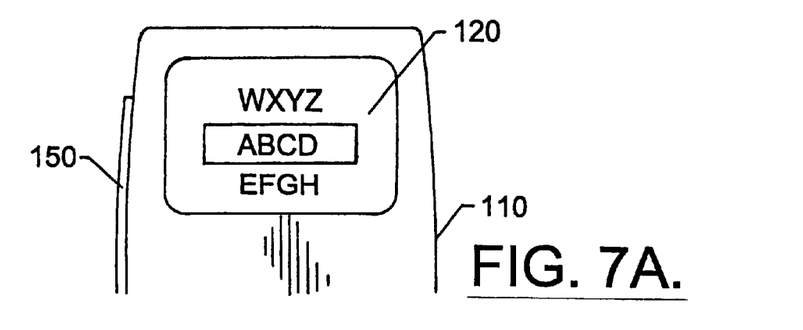
FIGS. 7A–7C illustrate operations for scrolling displayed items and selecting functions associated with a displayed item according to another aspect of the present invention.
Figure 7B:
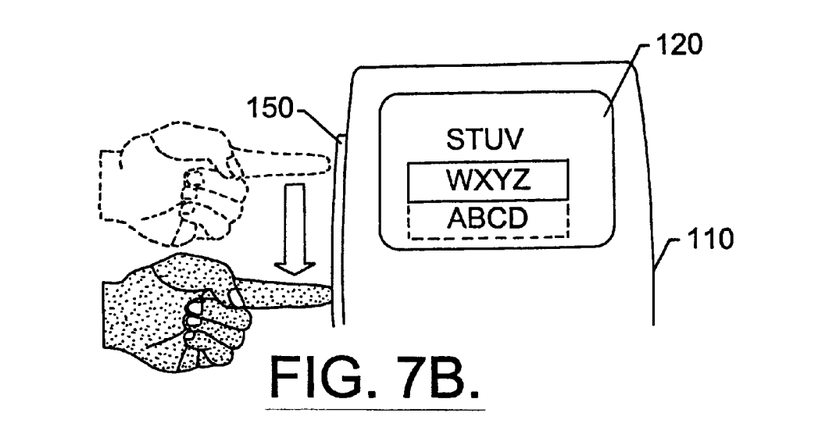
Figure 8:
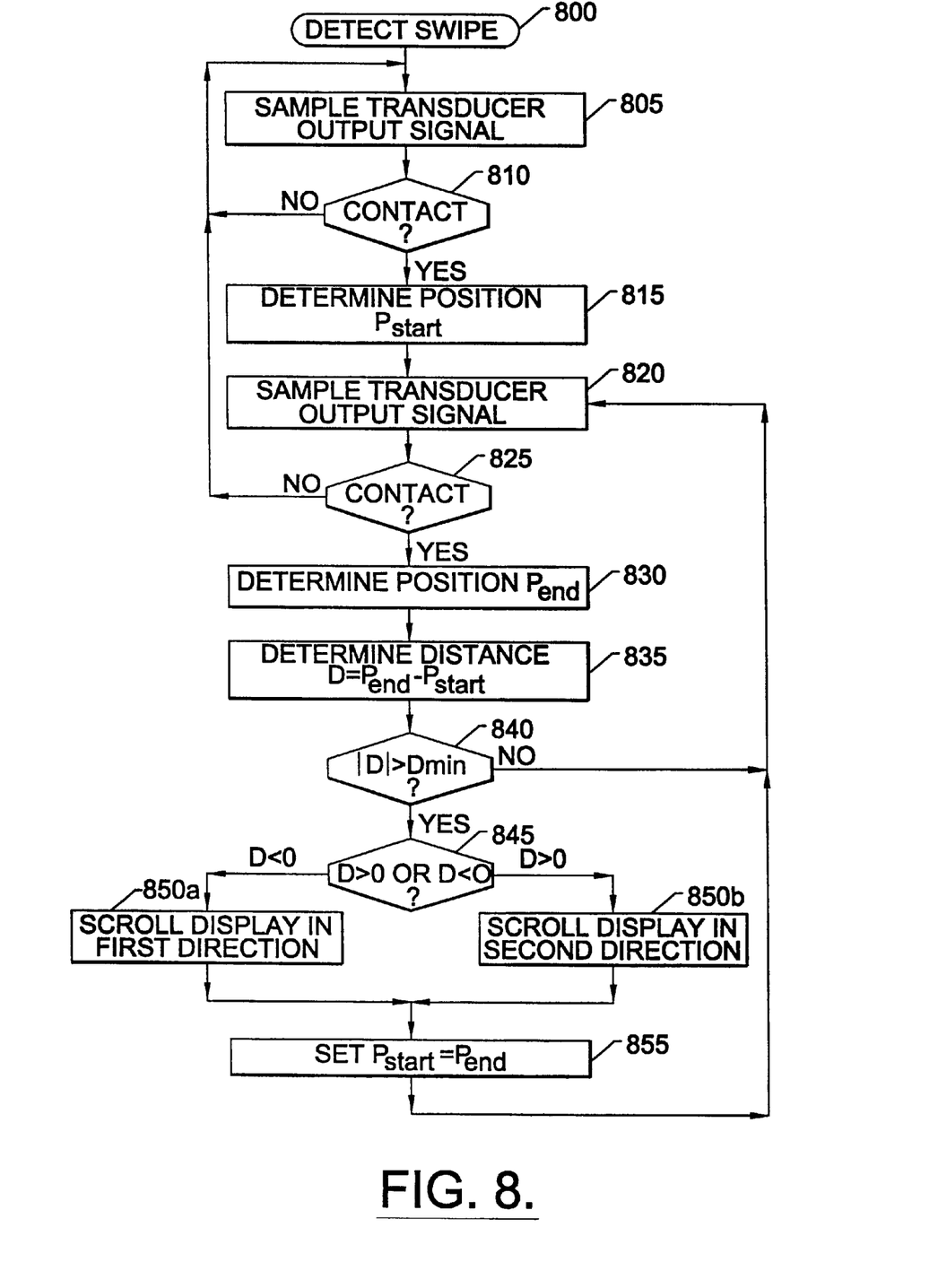
FIG. 8 is a flowchart illustration of operations for detecting a swiping contact with a contact-sensitive transducer according to another aspect of the present invention.
Figure 9:
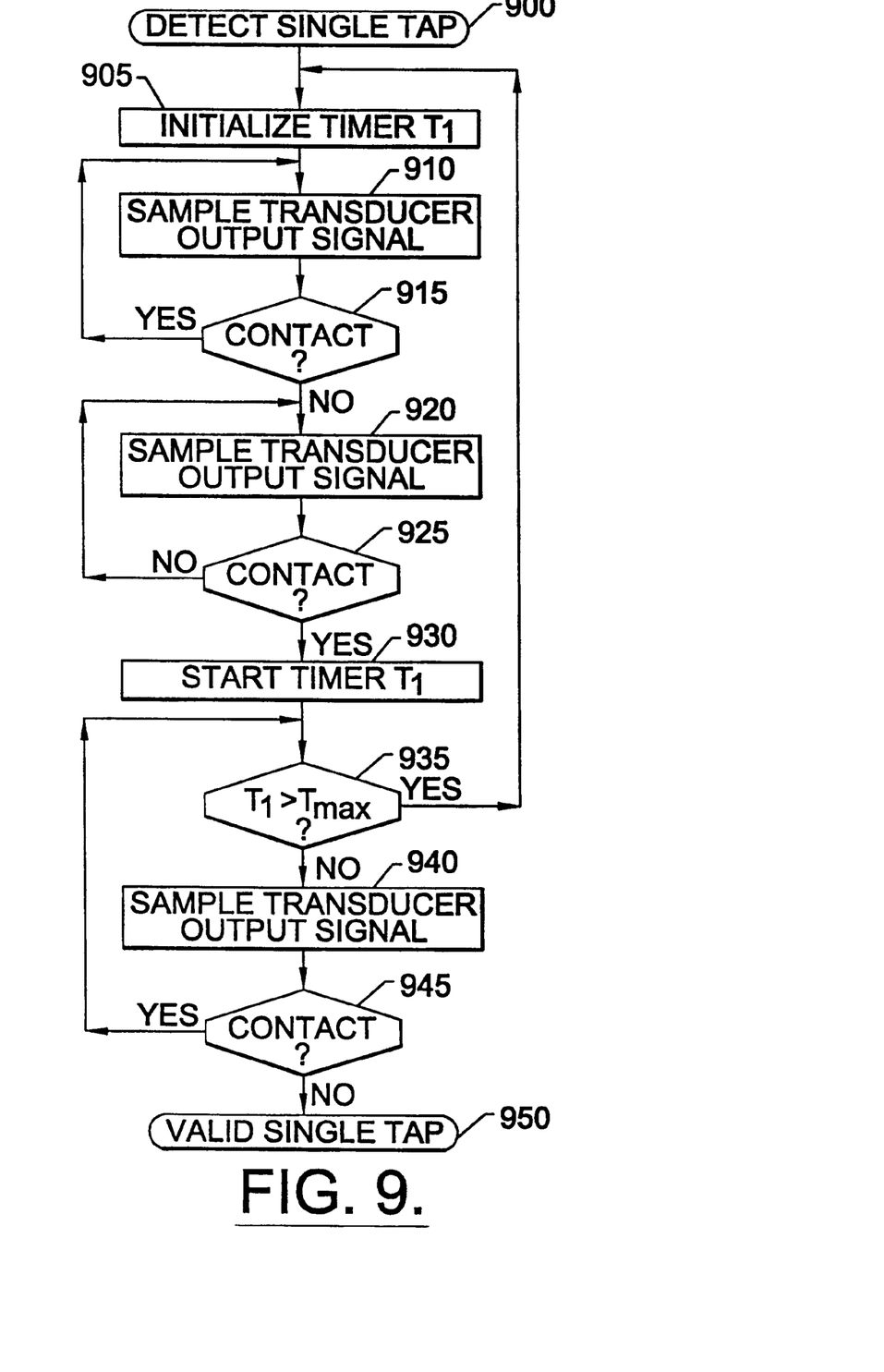
FIGS. 9–10 are flowchart illustrations of operations for detecting contacts with a contact-sensitive transducer according to aspects of the present invention.
Figure 10:
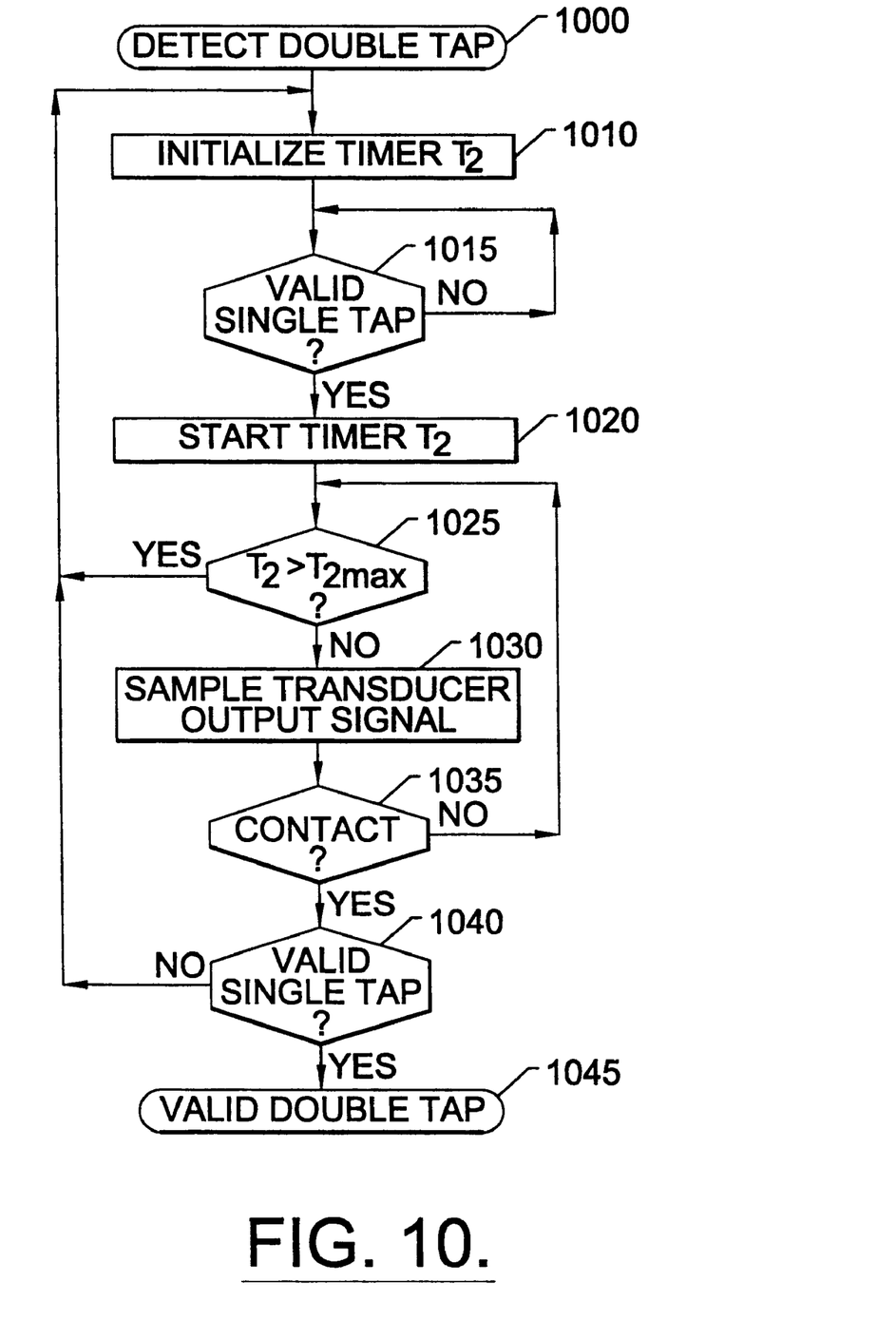

The conceptual illustrations of FIGS. 7A–7B and the flowchart illustrations of FIGS. 8–10 illustrate methods and apparatus for determining contact with a contact-sensitive transducer to identify graphical objects on a display and for initiating functions associated with the identified objects. It will be understood that blocks of the flowchart illustrations, and combinations of blocks in the flowchart illustrations, can be implemented by computer program instructions which may be loaded onto a computer or other programmable data processing apparatus to produce a machine such that the instructions which execute on the computer or other programmable data processing apparatus create means for implementing the functions specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks. Accordingly, blocks of the flowchart illustrations support combinations of means for performing the specified functions and combinations of steps for performing the specified functions. It will also be understood that each block of the flowchart illustrations, and combinations of blocks in the flowchart illustration, can be implemented by special purpose hardware which performs the specified functions or steps, or combinations of special purpose hardware such as microcontrollers, microprocessors, digital signal processing (DSP) chips, application-specific integrated circuits (ASICS) or the like, which execute computer instructions.

Figure 7C:
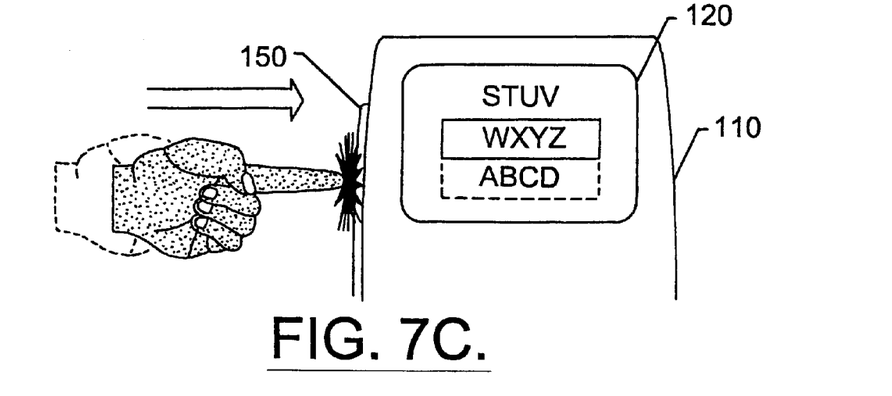

FIGS. 7A–7C illustrate operations for controlling display of an image on a radiotelephone display according to another aspect of the present invention, in particular, operations for "scrolling" graphical objects, here shown as rows, on a radiotelephone display 120, and for initiating a function associated with a graphical object identified on the display 120. At least one graphical object is displayed on a radiotelephone display 120. As illustrated in FIG. 7B, a user makes a swiping or displacement motion in contact with a contact-sensitive strip 150 mounted on a side of the radiotelephone 100, causing the display rows to "scroll" along the direction of the user's movement. Those skilled in the art will appreciate that "scrolling" in a generic sense refers to selective display of a row on the display 120, and may be encompass a number of different graphical operations. For example, as depicted in FIGS. 7A–7C, a plurality of rows may be displayed on the display 120, and a selected one of displayed rows may be highlighted or otherwise identified in response to the user input. Different rows may be sequentially displayed on the display 120, giving the appearance of a scrolling movement. In addition, actions such as scrolling by sequentially highlighting rows or other graphical objects or moving a cursor to sequentially indicate rows or other graphical objects responsive to a swiping motion on the transducer 150 may also be employed.

As illustrated in FIG. 7C, a function associated with an item identified by, for example, highlighting or cursor positioning, is initiated with the user performs a predetermined number of momentary contacts or taps on the contact-sensitive transducer 150, as illustrated in FIG. 7C. These momentary contacts or taps may occur anywhere along the contact-sensitive transducer 150. Those skilled in the art will appreciate that a number of variations on the above-described operations may be performed within the scope of the present invention. For example, instead of providing multi-graphical object display, the display 120 may be configured to display only one row at a time, sequentially displaying rows stored in memory to give the appearance of scrolling.

FIG. 8 illustrates exemplary operations for detecting a swiping contact with a contact-sensitive transducer (Blocks 800 et seq.). The transducer output signal is sampled (Block 805). If the sample indicates contact of an object with the transducer, a starting position $P_{start}$ of contact is next determined (Blocks 810–815). The transducer output signal is again sampled (Block 820), and if contact is still detected, an ending position $P_{end}$ is determined (Blocks 825–830). A distance D is then determined from the starting and ending positions $P_{start}$, $P_{end}$ (Block 835). If the magnitude of the distance D is less than a minimum distance $D_{min}$, the movement is disregarded and another sample obtained (Blocks 840–820). If the distance D is sufficiently large, however, the controller determines the direction of the movement by looking at the sign of the distance D (Block 845). If the distance D is negative, the display is scrolled in a first direction (Block 850a); if the distance D is positive, however, the display is scrolled in a second direction (Block 850b). The ending position is then used as a new starting position (Block 855).

FIG. 9 illustrates exemplary operations (Blocks 900 et seq.) for detecting a momentary contact or tap on a contact-sensitive transducer according to another aspect of the present invention. Generally speaking, a momentary contact or tap is detected by satisfaction of a series of three conditions: (1) absence of contact with the contact-sensitive transducer; (2) contact with the contact-sensitive transducer; and (3) termination of contact with the contact-sensitive transducer within a predetermined time period. In the exemplary operations shown, a timer $T_1$ (for example, a software timer implemented in the microcontroller 410 of FIG. 4) is initialized (Block 905). The output signal from a contact-sensitive transducer is sampled (Block 910). If the sampled output signal indicates that an object is in contact with the transducer, the output signal is repeatedly sampled until contact is not detected (Blocks 910–915). Once no contact is detected, the first condition for a tap is satisfied. A second round of sampling is then initiated, with the output being sampled until contact is again detected (Blocks 920–925). Once contact is again detected, the second condition for a tap is satisfied. The timer $T_1$ is then started (Block 930). As long as contact continues and the time measured by the timer $T_1$ is less than a predetermined maximum time interval $T_{max}$, the output of the transducer is repeatedly sampled (Blocks 935–945). If contact ceases before the timer $T_1$ exceeds the maximum time $T_{max}$, the third condition for a tap has been satisfied, and a valid single tap has been detected (Block 550). However, if the timer $T_1$ exceeds the maximum time $T_{max}$ before contact ceases, the timer $T_1$ is reinitialized (Block 905) and the detection process begins anew.

FIG. 10 illustrates operations (Block 1000 et seq.) for detecting a double tap on the contact-sensitive transducer. A second timer $T_2$ is initialized (Block 1010). Once a valid single tap is detected, the second timer $T_2$ is started (Blocks 1015–1020). As long as the time measured by the second time $T_2$ remains less than a second maximum time interval $T_{2max}$, and no contact with the transducer is detected, the transducer is repeatedly sampled (Blocks 1025–1035). If the timer has yet to expire when contact is detected, it is next determined whether the contact constitutes a valid single tap (Block 1040). If a valid single tap is detected, a valid double tap has occurred (Block 1045). If not, the second timer $T_2$ is reinitialized (Block 1005), starting the detection process anew.

Figure 11:
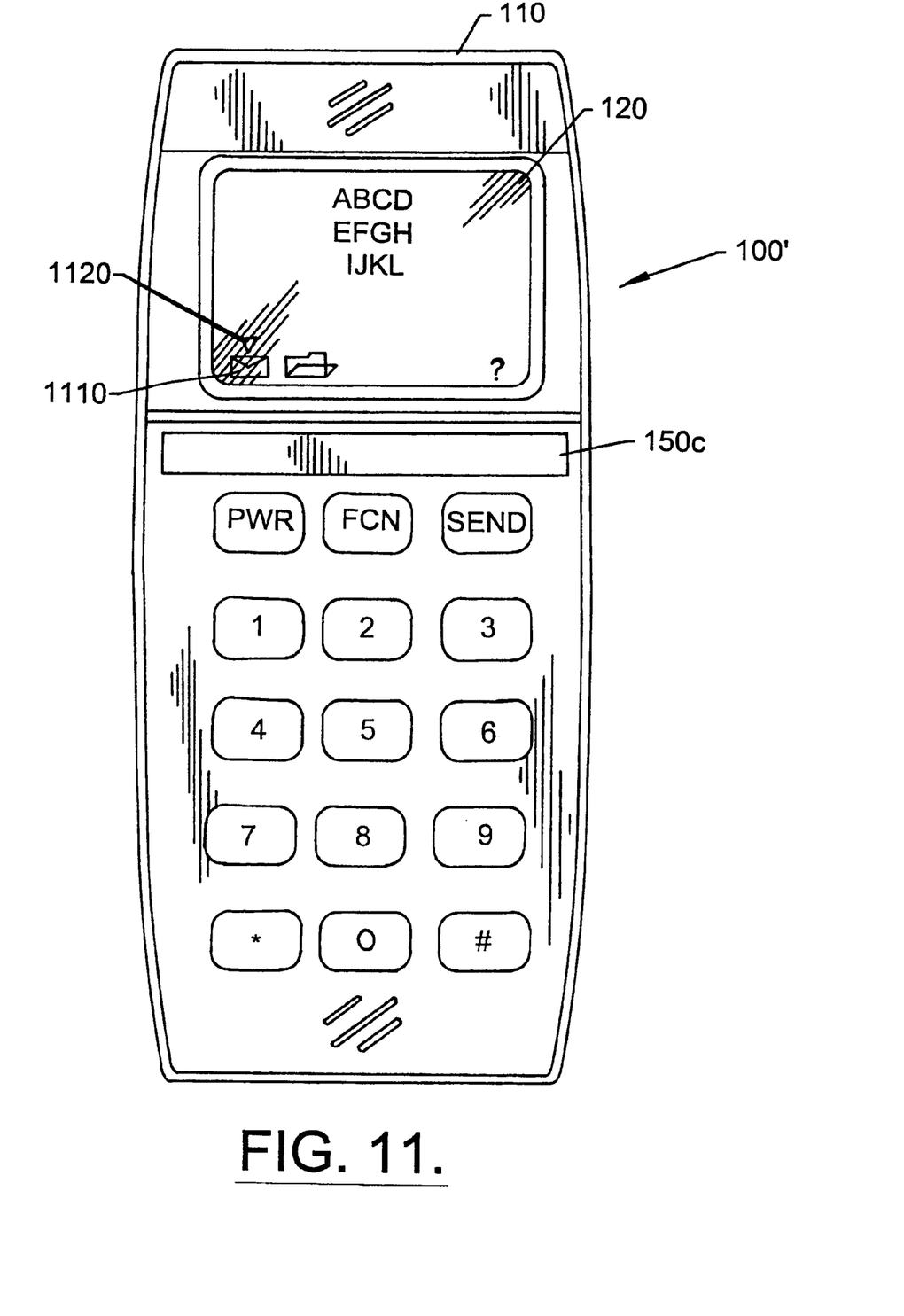
FIG. 11 illustrates a radiotelephone with a horizontally mounted contact-sensitive strip according to another embodiment of the present invention.

FIG. 11 illustrates another embodiment according to the present invention, a radiotelephone 100' which includes a horizontally-arranged contact-sensitive transducer 150c, here shown mounted on a front fact of the radiotelephone housing 110, near the display 120. In a manner similar to that described with respect to the side-mounted transducers of FIG. 3, the transducer 150c may be used to selectively display column-organized graphical objects on the display 120 based on contact of an object, e.g., a finger or stylus, with the contact-sensitive transducer 150c. For example, as illustrated in FIG. 11, icons 1110 may be displayed in columns on the display 120, and may be selectively identified according to contact with the contact sensitive transducer 150c, using apparatus and operations similar to those described with respect to FIGS. 4–10. An icon may be identified by several techniques, such as by highlighting or by displaying a cursor 1120 adjacent the identified icon. A function associated with the identified icon may be selected using apparatus and operations manner similar to those described with respect to FIGS. 7A–7C. Those skilled in the art will also appreciate that other embodiments may include side-mounted contact-sensitive strips such as those illustrated in FIG. 3 in combination with a horizontally-mounted contact-sensitive strip as illustrated in FIG. 11 to provide both row and column-oriented controls for the display 120.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A radiotelephone, comprising:

a housing comprising a front surface and respective first and second edge surfaces disposed on respective opposite sides of said front surface;

a radiotelephone communications transceiver, supported by said housing;

a display, supported by said housing, that displays an image at said front surface of said housing;

a contact-sensitive transducer, supported by said housing and having a contact-sensitive surface disposed at at least one of said first and second edge surfaces, which produces an output signal that characterizes contact of an object along said contact-sensitive surface of said contact-sensitive transducer; and a controller, responsive to said output signal and operatively associated with said display and said radiotelephone communications transceiver, which controls at least one of said display and said radiotelephone communications transceiver according to said output signal of said contact-sensitive transducer, wherein said controller is configured to selectively display a graphical object on said display according to said output signal of said contact-sensitive transducer, and wherein said controller comprises means, responsive to said contact-sensitive transducer, for scrolling displayed rows along an axis of said display based on the output signal of said contact-sensitive transducer.

2. A radiotelephone according to claim 1, wherein said means for scrolling comprises:

means, responsive to said output signal of contact-sensitive transducer, for detecting moving contact with said contact-sensitive transducer along said axis of said contact-sensitive transducer; and means, responsive to said means for detecting moving contact, for scrolling displayed rows along said axis of said display based on the detected moving contact.

3. A radiotelephone, comprising:

a frame;

a radiotelephone communications transceiver, supported by said frame;

a display, supported by said frame;

a contact-sensitive transducer, supported by said frame, which produces an output signal that characterizes contact of an object along a contact-sensitive surface of said contact-sensitive transducer; and a controller, responsive to said output signal and operatively associated with said display and said radiotelephone communications transceiver, which controls at least one of said display and said radiotelephone communications transceiver according to said output signal of said contact-sensitive transducer, wherein said controller has a first mode wherein said controller is responsive to contact with said contact-sensitive transducer and a second mode wherein said controller is unresponsive to contact with said contact-sensitive transducer, and wherein the radiotelephone further comprises means for placing said controller in one of said first mode or said second mode in response to an input from a user.

4. A radiotelephone, comprising:

a frame;

a radiotelephone communications transceiver, supported by said frame;

a display, supported by said frame;

a contact-sensitive transducer, supported by said frame, which produces an output signal that characterizes contact of an object along a contact-sensitive surface of said contact-sensitive transducer; and a controller, responsive to said output signal and operatively associated with said display and said radiotelephone communications transceiver, which controls at least one of said display and said radiotelephone communications transceiver according to said output signal of said contact-sensitive transducer, wherein said controller comprises:

a first control circuit, responsive to said contact-sensitive transducer, which controls said radiotelephone communications transceiver and said display according to said output signal of said contact-sensitive transducer; and a second control circuit, responsive to said contact-sensitive transducer, which controls power transfer from said power supply to said first control circuit according to said output signal from said contact-sensitive transducer.

5. A radiotelephone according to claim 4, wherein said first control circuit comprises a microcontroller, and wherein said second control circuit controls power transfer from said power supply to said microcontroller according to said output signal of said contact-sensitive transducer.

6. A radiotelephone, comprising:

a housing comprising a front surface and respective first and second edge surfaces disposed on respective opposite sides of said front surface;

a radiotelephone communications transceiver, supported by said housing;

a display, supported by said housing, that displays an image at said front surface of said housing;

first and second contact-sensitive transducers, supported by said housing and having respective contact-sensitive surfaces disposed at respective ones of said first and second edge surfaces, which produce respective first and second output signals that characterize contact along respective ones of said contact-sensitive surfaces of said first and second contact-sensitive transducers, wherein said first and second contact-sensitive transducers comprise respective first and second contact-sensitive strips mounted at respective ones of said first and second edge surfaces; and a controller, responsive to said first and second output signals and operatively associated with said display and said radiotelephone communications transceiver, which controls at least one of said display and said radiotelephone communications transceiver according to said first and second output signals of said first and second contact-sensitive transducers, wherein said controller has a first mode wherein said controller is responsive to said first contact-sensitive transducer and unresponsive to said second contact-sensitive transducer, and a second mode wherein said controller is responsive to said second contact-sensitive transducer and unresponsive to said first contact-sensitive transducer, and further comprising means for placing said controller in one of said first mode or said second mode.

* * * * *